United States Patent
Nowakowski

(10) Patent No.: US 7,816,603 B2
(45) Date of Patent: Oct. 19, 2010

(54) CAPSULE HOUSING EXTENDING IN AN ESSENTIALLY TUBULAR MANNER COMPRISING AT LEAST THREE HOUSING SECTIONS

(75) Inventor: Andrzej Nowakowski, Berlin (DE)

(73) Assignee: Siemens AG, Munich (DE)

( * ) Notice: Subject to any disclaimer, the term of this patent is extended or adjusted under 35 U.S.C. 154(b) by 372 days.

(21) Appl. No.: 11/994,074

(22) PCT Filed: Jun. 23, 2006

(86) PCT No.: PCT/EP2006/063512
§ 371 (c)(1),
(2), (4) Date: Dec. 27, 2007

(87) PCT Pub. No.: WO2007/000421
PCT Pub. Date: Jan. 4, 2007

(65) Prior Publication Data
US 2008/0202788 A1 Aug. 28, 2008

(30) Foreign Application Priority Data
Jun. 27, 2005 (DE) .................. 10 2005 031 098

(51) Int. Cl.
*H02G 3/08* (2006.01)

(52) U.S. Cl. .................. 174/50; 174/559; 174/58; 174/60; 439/535; 248/906

(58) Field of Classification Search .................. 174/50, 174/559, 58, 60, 63; 220/4.02; 248/906; 439/535
See application file for complete search history.

(56) References Cited

U.S. PATENT DOCUMENTS 4,442,941 A * 4/1984 Keith .................. 206/540

FOREIGN PATENT DOCUMENTS

| DE | 19730260 A1 | 1/1999 |
| RU | 2216084 C2 | 11/2003 |
| WO | 9903181 A1 | 1/1999 |

* cited by examiner

*Primary Examiner*—Dhiru R Patel
(74) *Attorney, Agent, or Firm*—Laurence A. Greenberg; Werner H. Stemer; Ralph E. Locher

(57) ABSTRACT

A capsule housing has at least three housing sections, extends along an axis, and has a substantially tubular-shaped frame. The housing sections are connected together on the front side thereof and they surround a receiving chamber on the inside. The inside has an electric circuit device. The receiving chamber has a smaller transversal cross-section than the respective cross-section in the region of the second and the third housing section in the region of the first housing section which connects the second and the third housing sections.

9 Claims, 4 Drawing Sheets

CAPSULE HOUSING EXTENDING IN AN ESSENTIALLY TUBULAR MANNER COMPRISING AT LEAST THREE HOUSING SECTIONS

BACKGROUND OF THE INVENTION

Field of the Invention

The invention relates to a gas-tight capsule housing, which comprises at least three housing sections and which extends along an axis in an essentially tubular manner, the first housing section of which is flanged between a second and a third housing section, the housing sections forming the boundary of a pressure-tight receiving chamber for an electrical switching device.

By way of example, a capsule housing of this kind is disclosed in the application DE 43 20 906 A1. Here, three housing sections are each flanged to one another on their face sides. The three housing sections are identical in design. This reduces the number of basic forms required. The housing sections are each provided with flat face flanges, which are formed radially pointing outwards on their face sides. The flat face flanges are pressed together by means of appropriate joining elements so that a gas-tight capsule housing extending in an essentially tubular manner is produced.

When switching devices are installed in gas-tight capsule housings filled with insulating gas, the overall installed size of such switching devices can be reduced. If the insulating gas is subjected to an increased pressure, this can result in a considerable reduction in the overall installed size. As capsule housings of this kind are considered to be pressure vessels due to the increased pressure prevailing in the interior, evidence of appropriate pressure tests must be provided.

Joints constitute weak points in a capsule housing. In order to guarantee an adequate bursting strength, the flat face flanges used must be generously sized. As a result of this sizing, firstly an increased use of material is required for the flat face flange, and secondly the circumference of the capsule housing is increased due to the flat face flange, which runs radially around the circumference. Particularly when comparatively slim capsule housings, which are to be arranged immediately adjacent to one another, are used, this can lead to an increased space requirement.

BRIEF SUMMARY OF THE INVENTION

The object of the invention is to develop a capsule housing of the kind mentioned in the introduction, which has a high bursting strength and at the same time has a slim exterior contour.

In the case of a capsule housing of the kind mentioned in the introduction, according to the invention, this is achieved in that the receiving chamber has a smaller cross section in the region of the first housing section, which connects the second and the third housing section, than the respective cross sections of the receiving chamber in the region of the second and the third housing section.

The receiving chamber for receiving the electrical switching device must, on the one hand, fulfill requirements relating to a dielectric strength, and on the other, specifications of pressure vessel ordinances must be fulfilled.

For dielectric reasons, it is necessary to keep the interior as free as possible from edges and projections, i.e. the receiving chamber has contours, which in themselves are rounded. At the end, the tubular capsule housing can be closed by means of appropriate dome-like moldings or covers. Preferably, circular or oval cross sections are used for the design of receiving chambers. In the case of an essentially cylindrical design of the housing sections, it is advantageous when the length of each housing section in the direction of the cylinder axis is at least equal to the diameter of the cylindrical section. Here, the diameter in each case is the diameter of the interior in the particular housing section in which the receiving chamber has an essentially cylindrical form. The length is referred to the respective cylindrical section of the receiving chamber. A cylindrical form is also understood to mean that flanges, particle traps or other fittings, for example, partially break up the cylindrical form.

If the cross section is reduced in the region of the first housing section compared with the cross section in the region of the second and third housing section, then a receiving chamber is produced, which has a central section, which is narrowed compared with the sections, which are arranged at the ends. A narrowing should be formed in such a way that the receiving chamber tapers conically from the sections with the larger cross sections toward the central first housing section. At the same time, the first housing section, itself with an essentially cylindrical design, can be designed to form the boundary of the receiving chamber, and only the transitions between the first and second or the first and third housing section respectively have a conical form.

With the tapering of the capsule housing in the central region, club-like thickened areas are produced at the ends of the receiving chamber. It is beneficial to allow gas flows that occur, for example initiated by the appearance of arcs, to disperse in the club-like thickened regions and to appropriately calm them here. By this means, the centrally arranged first housing section is protected against severe loadings. As a result of the reduction in cross section of the central region, the pressure resistance of the first housing section is increased compared with the second and third housing section. Furthermore, this results in flow conditions inside the receiving chamber, which promote a relaxation of overpressure waves etc. in the end-mounted second and third housing sections.

A further advantageous embodiment can provide that for flanging the second housing section onto the first housing section or the third housing section onto the first housing section, a flange joint is formed, which has a flat face flange on the first housing section, which is pressed onto a face of the first or the third housing section by means of a releasable joining element, a wall of the second or third housing section being made thicker in the region of the face and the thickened area being formed at least partially radially inward thus reducing the cross section of the receiving chamber.

As stated above, when using flange joints formed by two flat face flanges, the flat face flanges need to be generously sized in order to overcome outward and downward bending forces acting on the shoulder of the flat face flange. The breaking forces can be overcome in an improved manner by using a flange joint with a flat face flange, which butts against the face of a strengthened wall. Lines of force can be induced almost linearly in the strengthened wall. As a result of the radial thickened area of the strengthened wall on the inside of the receiving chamber, a transition can be made in a suitable manner from the larger cross section of the second and third housing section respectively to the smaller cross section of the first housing section. As the wall itself is strengthened by way of its wall thickness and this is achieved conically with a continuous transition in order to form a receiving chamber in the interior of the capsule housing which is free from edges and projections, the forces can be induced uniformly on the circumference of the second and third housing sections. Sufficient space to accommodate the flat face flange of the flange joint is created outward in a radial direction by reducing the cross section of the first housing section. As a result of tapering the receiving chamber and appropriately tapering the outer contour of the capsule housing, the flat face flange itself can be arranged in the shadow region of the thickened face wall of the second and third housing section respectively of the capsule housing.

The more pronounced the narrowing of the first housing section is, the more space is provided for accommodating the flat face flange. In a simple embodiment, each of the three housing sections can advantageously be designed to form an essentially cylindrical section of the receiving chamber over a large part of its length, the diameter of the cylindrical section of the first housing section being less than the diameters of the cylindrical sections of the receiving chamber arranged at each end. The exterior contour of the capsule housing can be narrowed following the receiving chamber. Continuous stepless transitions can be formed in the region of the joints between the individual cylindrical sections of the receiving chamber.

At the same time, the flat face flange can advantageously be designed to be offset radially outward with respect to the axis.

A flat face flange, which is formed radially outward on the first housing section, allows the flange to be simply screwed to the face of the second and third housing sections respectively. Such a flange joint can be undone with simple means. In this way, it is possible to carry out repairs to the capsule housing itself or to an electrical switching device arranged in the interior of the capsule housing.

A further advantageous embodiment can provide that the thickened area is formed radially outward to overhang the outer contour of the second or third housing section.

As well as a wall, which is thickened radially toward the interior, the face end of the second or third housing section respectively facing the flat face flange can be extended outward and the wall additionally thickened. This enables larger forces to be induced into the tubular housing sections more easily.

When the receiving chamber tapers radially, a continuous transition can be achieved between the diameters of the different housing sections by means of a wall, which is thickened radially inward. The thickened section can be designed to be roughly symmetrically produced radially inward and radially outward. In this way, forces to be induced can be induced in the central regions of the walls of the second and third housing sections respectively by means of joining elements. This prevents the forces being diverted diagonally and the associated buckling and bending moments.

A flange joint designed in such a way is suitable for transmitting high forces such as can arise in the event of explosions or discharges occurring in the interior of the capsule housing for example. Here, the circumference of the capsule housing is increased to a lesser extent than when two conventional flat face flanges, which are to be flanged to one another, are used.

An advantageous embodiment can provide that the flat face flange has openings through which joining elements, which are anchored in the face of the wall of the second or third housing section of the capsule housing, protrude.

By way of example, bolts, screws, nuts, rivets or other releasable joining elements can be used as joining elements. At the same time, the joining elements can be anchored in the face of the second or third housing section in such a way that they themselves are permanently anchored within the wall, for example by welding in or casting on the joining elements. However, the joining elements, which protrude through the openings, can also be designed so that they can be moved independently from the second or third housing section of the capsule housing. In this case, for example, holes with internal threads can be made in a face of a wall into which bolts serving as joining elements are to be screwed.

A further advantageous embodiment can provide that ribs, which stabilize the flat face flange, are arranged between openings, the ribs being aligned parallel with one another.

Ribs are arranged on the flat face flange in order to be able to cope with the bending forces, which occur at the flat face flange. These ribs extend on the side facing away from the flange surface of the flat face flange and constitute a joint between a sleeve surface of the capsule housing and the flat face flange. In order to be able to use an effective manufacturing method, the ribs are aligned parallel with one another. The ribs each have a plate-like structure wherein their length or height is greater than their thickness. The ribs prevent the flat face flange from deforming.

A further advantageous embodiment of the invention can provide that identical flange joints in each case are arranged between the first and second housing section as well as the first and third housing section.

As the cross section of the receiving chamber is reduced in the first housing section, it is advantageous to provide identical flange joints on both sides for flanging on the second and third housing section respectively. It is particularly advantageous when the two flange joints are arranged as a mirror image with regard to a plane lying perpendicular to the axis. As a result of this, for both flange joints, the respective undercut zone in the region of the first housing section can be used to accommodate joining elements as well as the flat face flange.

A further advantageous embodiment can provide that an interrupter unit of a compressed gas insulated circuit breaker is arranged along the axis, wherein gases, which are produced during a switching operation, flow out into the second or third housing section respectively where they swirl around.

Circuit breakers are used for switching operating currents and short-circuit currents. The formation of hot switching gases cannot be ruled out particularly when switching short-circuit currents, which can be associated with the occurrence of corresponding short-circuit arcs in the interior of the capsule housing. Switching paths for the circuit breaker can be designed to be located in the second or third sub-section of the capsule housing in each case. Particularly when switching currents in the high-voltage range, the use of two switching paths in series can be provided in high-voltage circuit breakers in order to guarantee the required dielectric strength. The two switching paths are electrically conductively connected to one another through the first housing section of the capsule housing. The two switching paths are essentially arranged in the second and third housing section of the capsule housing respectively. The switching paths are usually designed identically and have arcing and rated current contact pieces, which can be moved relative to one another.

A further advantageous embodiment can provide that a drive device is introduced into the interior of the capsule housing on the sleeve side of the first housing section.

In an embodiment of a high-voltage circuit breaker described above with two switching paths, which extend in the second and third housing section respectively, it is advantageous to introduce a drive device on the sleeve side of the first housing section. Examples of a drive device of this kind can be a shaft or electrically insulating switching rod, which transmits a drive movement of a motor into the interior of the capsule housing. Advantageously, a gear unit, for example, which is used to redirect the drive movement in the direction of the second or third housing section respectively and which couples the movable contact pieces to the drive device, can be designed to be arranged within the first housing section of the capsule housing.

A further advantageous embodiment can provide that the housing sections are cast bodies formed from electrically conducting material.

The use of electrically conducting material for embodying the capsule housing enables it to be permissible to touch the outer surface of the capsule housing. As a rule, the housing itself is connected to earth potential. In the event of an electrical fault, for example contact between a live conductor and the capsule housing, it is guaranteed that a fault current path is rapidly built up, as a result of which appropriate protective devices trip and danger to equipment and personnel is prevented. The use of a casting method for manufacturing a cast body is a measure for producing a large number of dimensionally consistent housing sections. In doing so, it must be ensured that the cast bodies themselves have sufficient gas tightness. Furthermore, by using parallel ribs on the flat face flange, it is possible to use simple casting molds, as the cast body can easily be removed from the casting molds.

Exemplary embodiments of the invention are shown schematically below in drawings and subsequently described in more detail. In the drawings:

DESCRIPTION OF THE INVENTION

Figure 1:
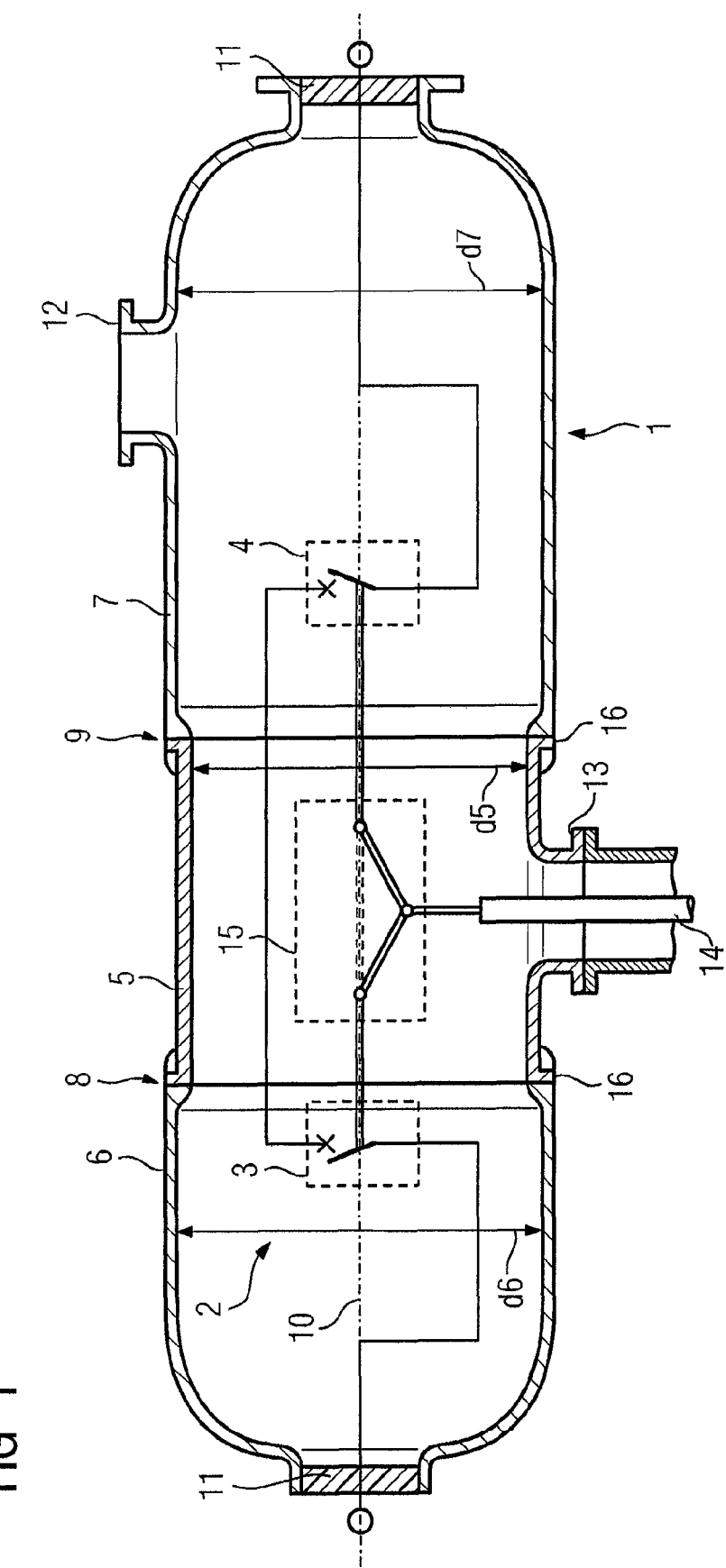
FIG. 1 shows an essentially tubular capsule housing, which has a first, a second and a third housing section.

FIG. 1 shows a section through a gas-tight capsule housing 1 of an electrical switching device 2. The electrical switching device 2 has an interrupter unit, which includes a first and a second switching path 3, 4, which are connected in series with one another. Each of the switching paths 3, 4 is designed, for example, as a switching path, which works according to the self-extinction principle. By way of example, patent specifications U.S. Pat. Nos. 6,177,643 B1 and 6,271,494 B1 are mentioned in this regard, in which the structural design of a switching path with arcing and rated current contact pieces, which can be moved relative to one another, and an insulating nozzle, are described. The content of the above-mentioned publications is part of this application.

The interior of the capsule housing 1 is filled with an electro-negative gas, for example sulfur hexafluoride, nitrogen or a mixture of gases. The gas is subjected to an increased pressure relative to the environment in order to increase its insulating strength. When the electrical switching device 2 is switched, arcs, which heat up and expand the insulating gas in the interior of the capsule housing 1, can occur between the movable contact pieces of the switching paths 3, 4. The expansion causes the pressure in the interior of the sealed capsule housing 1 to increase. The capsule housing 1 must be sized in such a way that expected overpressures in its interior do not have a detrimental effect on the capsule housing 1.

In order to produce a pressure-tight structure, the capsule housing 1 is made up of a first housing section 5, a second housing section 6 and a third housing section 7. Each of the housing sections 5, 6, 7 has a tubular structure. The first housing section 5 and the second housing section 6 are joined to one another on their face sides by means of a first flange joint 8. Likewise, the first housing section 5 and the third housing section 7 are joined to one another by means of a second flange joint 9. The flange joints 8, 9 are designed to be gas-tight. The basic form of the housing sections 5, 6, 7 is designed to be rotationally symmetrical. The housing sections 5, 6, 7 are arranged to lie so that their rotational axes are coaxial with one another and are joined to one another on their face sides so that the capsule housing 1 has an axis 10, which corresponds to the rotational axes of the housing sections 5, 6, 7. The housing sections 5, 6, 7 are each essentially designed as a hollow cylinder. The second and the third housing sections 6, 7 each have dome-shaped regions on the ends facing away from the first housing section 5. Flanges, through which electrical feed cables can be fed to the switching paths 3, 4 of the electrical switching device 2, are arranged on each of the dome-shaped regions. At the same time, the electrical cables can be designed to be fed through gas-tight disk insulators 11, which are arranged to be pressure-tight. Alternatively, however, flange joints 12 can also be provided on the sleeve side of the second and third housing sections 6, 7 respectively in order to feed the electrical feed cables into the capsule housing 1 on the sleeve side, for example.

The housing sections 5, 6, 7 enclose the pressure-tight receiving chamber for the interrupter unit. Because of their rotationally symmetrical design, the sections of the receiving chamber bounded by the housing sections 5, 6, 7 are cylindrical in each case. At the end regions with respect to the axis 10, the design of the respective sections of the receiving chamber deviates from a cylindrical design and appropriate tapering is used in order to provide a transition to subsequent housing sections. The cylindrical sections of the second housing section 6 and the third housing section 7 have a larger diameter d6, d7 than the cylindrical section of the receiving chamber, which is enclosed by the first housing section 5. The receiving chamber has a narrowed section. The rotationally symmetrical outer sleeve surfaces of the housing sections 5, 6, 7 are designed in such a way that the outside diameter of the second and third housing section 6, 7 is greater than the outside diameter of the first housing section 5. A further flange 13, through which a drive rod 14 is fed into the capsule housing 1 in a gas-tight manner, is arranged on the sleeve side of the first housing section 5. The drive rod 14 is coupled to a motor, for example, and transmits a drive movement. In order to distribute the drive movement transmitted by the drive rod 14, an angled gear unit 15 is arranged in the region of the first housing section 5. The angled gear unit 15 converts a linear movement, which is fed into the capsule housing 1 essentially perpendicular to the axis 10, into a linear movement, which is aligned essentially parallel to the axis 10. In doing so, the movement is transmitted to the movable contact pieces of the switching paths 3, 4 in both the second housing section 6 and in the third housing section 7 so that a switching operation can be carried out with the electrical switching device 2.

The first housing section 5 has a flat face flange 16 at each end. The flat face flanges 16 are offset radially outward, run around the axis 10 and are joined to a wall of the first housing section 5. At the same time, the diameters of the flat face flanges 16 are sized so that they correspond to the outside diameters of the second housing section 6 and the third housing section 7 in the region of the flange joints. Both the second housing section 6 and the third housing section 7 have a thickening of their walls at their ends, which face toward the first housing section 5. At the same time, the thickening is designed so that the wall extends into the receiving chamber and leads over onto the inside diameter d5 of the cylindrical section of the receiving chamber, which is bounded by the first housing section 5. In order to avoid edges, the thickening is designed in such a way that there is a continuous transition between the regions with different diameters. This drawing in and at the same time strengthening of the wall of the second and third housing section 6, 7 results in a narrowing of the receiving chamber in the central region of the capsule housing 1. A section with smaller diameter, which extends from the first housing section 5 to the second and third housing section 6, 7, is formed centrally in the receiving chamber in the central region in which the angled gear unit 15 is arranged. On the one hand, this produces a burst-proof design of a capsule housing 1, which provides a sufficient volume in the interior for dispersing hot switching gases produced in the switching paths 3, 4 during a switching operation within the second and third housing section 6, 7. On the other hand, a capsule housing 1 is formed, which has no significant increase in circumference due to a circumferential flange, in spite of a flanging of individual housing sections 5, 6, 7. As a result, it is possible to position several capsule housings 1 so that they lie closely together on their sleeve sides.

Figure 2:
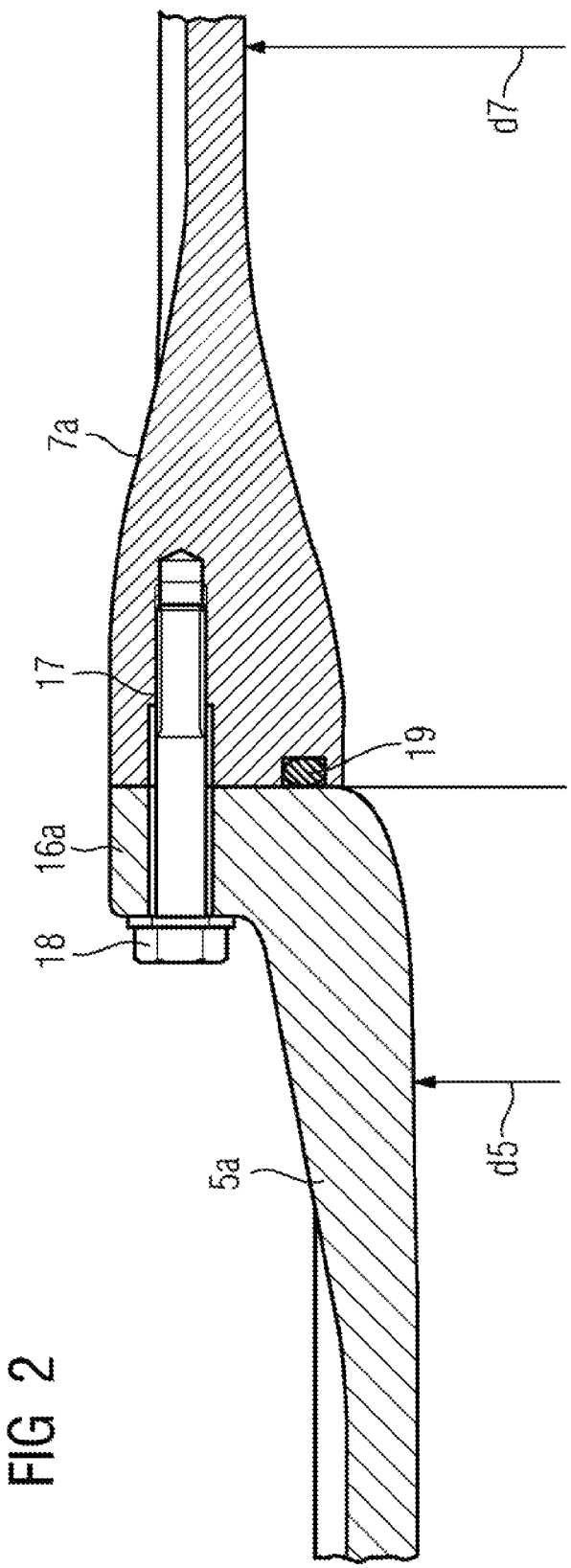
FIG. 2 shows a section through a flat face flange, which is flanged to a wall.

A section of a flange joint of a first housing section 5a and of a third housing section 7a is shown in FIG. 2. The wall of the third housing section 7a is arranged to be thicker in the direction of the flat face flange 16a of the first housing section 5a. In doing so, the thickening is firstly drawn inward into the bounded receiving chamber and, secondly, the thickening is also formed toward the outside. As a result of the thickening of the face of the third housing section 7a, sufficient volume is created in order to introduce a hole 17. The hole 17 is provided with an internal thread, into which a screw 18 can be screwed. In doing so, the screw 18 passes through an opening of the flat face flange 16a and presses this against the face of the third housing section 7a. A sealing ring 19 is placed in a slot at the position of the joint to seal the flange. In order to produce a uniform contact force, a multiplicity of openings 25 are arranged on the circumference of the flat face flange 16a, through which a multiplicity of screws 18 pass. Other joining elements can also be used instead of using a screw 18. For example, bolts can be provided, which are fitted to the face of the wall of the third housing section 7 and which are riveted after feeding through the openings 25 of the flat face flange 16a. In order to cope with the breaking forces at the flat face flange 16a, the wall of the first housing section 5a is additionally thickened in the region of the flat face flange 16a. In doing so, the flat face flange 16a is thickened essentially continuously in a radial direction outward at its base.

Figure 3:
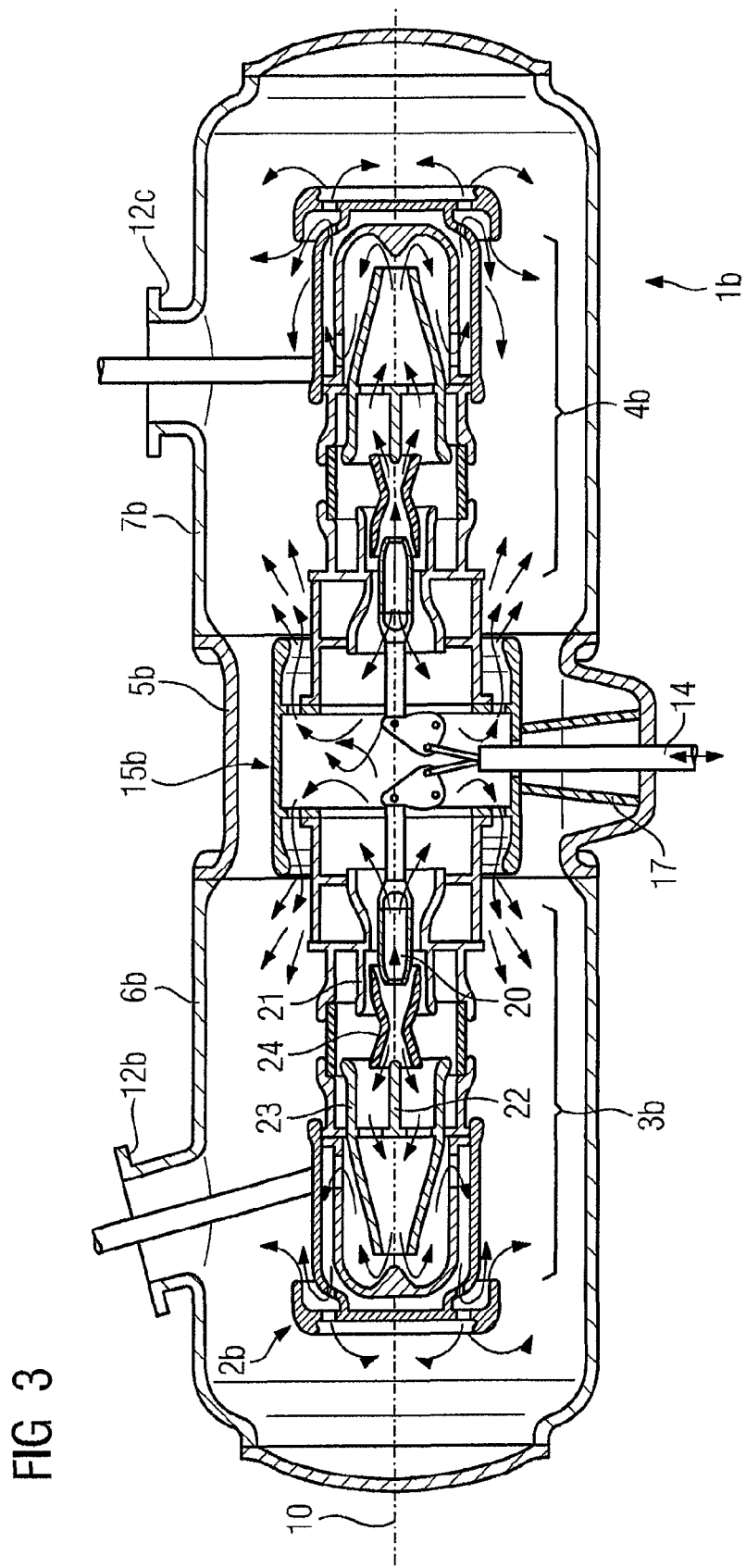
FIG. 3 shows a variant of a tubular capsule housing.

A variant of a capsule housing 1b, which is formed from a first, a second and a third housing section 5b, 6b, 7b, is shown in FIG. 3. The capsule housing 1b has basically the same construction as the capsule housing 1 shown in FIG. 1. Therefore, here too, the internal diameter of the first housing section 5b is reduced in such a way that the receiving chamber of the capsule housing 1b narrows in the central section. As in the exemplary embodiment shown in FIG. 1, the housing sections 5b, 6b, 7b are made from an electrically conducting material, for example cast aluminum. The first housing section 5b is extended conically at its ends in order to lead over onto the second and third housing section 6b, 7b. At the ends with respect to the axis 10, the capsule housing 1b has openings, which are sealed by means of blank covers. In the exemplary embodiment shown in FIG. 3, electrical cables are fed to the interrupter unit of a high-voltage circuit breaker, which is located in the interior, through flanges 12b, 12c formed on the sleeve side.

The interrupter unit has an essentially rotationally symmetrical form, the rotational axis being arranged essentially parallel to the axis 10. The interrupter unit has a first switching point 3b and a second switching point 4b. The switching points 3b, 4b are supported at their ends facing the first housing section 5b by a housing of an angled gear unit 15b. The electrically conducting housing is supported on the first housing section 5b by means of an insulated support 17. The electrically conducting housing of the angled gear unit 15b serves to electrically connect the two switching points 3b, 4b to one another. A drive movement in the central region of the capsule housing 1b can be introduced into said housing by means of a drive rod 14. A linear movement, which is essentially perpendicular to the axis 10, is converted by the angled gear unit 15b into a linear movement, which runs along the axis 10.

The way in which the switching paths work is explained below using the first switching path 3b as an example. The first switching path 3b has a movable arcing contact piece 20. The movable arcing contact piece 20 is surrounded coaxially by a movable rated current contact piece 21. A fixed arcing contact piece 22 and a fixed rated current contact piece 23 are arranged coaxially opposite. The movable arcing contact piece 20 is surrounded by an insulating nozzle 24. The insulating nozzle 24 is used to steer and guide switching gases. Before a trip operation, the rated current contact pieces 21, 23 and the arcing contact pieces 20, 22 are in electrically conducting contact. In the course of a trip movement, the movable arcing contact piece 20 and the movable rated current contact piece 21 are moved in the direction of the first housing section 5b. A contact separation then occurs at the rated current contact pieces 21, 23 followed by a separation of the arcing contact pieces 20, 22, which usually results in a switching arc. The switching arc heats and expands the insulating gas in the interior of the capsule housing 1b. Because of the increased gas pressure in the region of the switching point, the switching gas flows out of the switching point through appropriate dispersion channels. On the one hand, the switching gas is steered toward the angled gear unit 15b by the hollow movable arcing contact piece 20.

Exhaust openings, which allow the switching gas to escape from the region of the first housing section 5b in the direction of the second and third housing section 6b, 7b respectively, are arranged in the housing of the angled gear unit 15b. Deflectors are arranged on the housing of the angled gear unit 15b in order to assist the steering of the gas flow.

Furthermore, the switching gas is diverted by means of the insulating nozzle 24 in the direction of the fixed rated current and arcing contact pieces 22, 23. A dispersion labyrinth for steering and cooling the hot switching gases is arranged at the end of the first switching point 3b, which faces away from the angled gear unit 15b. This is essentially formed from cylindrical sections, which are placed inside one another and which have openings so that the switching gas disperses in a meandering fashion. After escaping from the dispersion labyrinth, the switching gas is steered against deflectors, as a result of which the switching gas relaxes within the part of the receiving chamber, which is enclosed by the second housing section 6b.

The second switching point 4b has an identical structure and works on the same principles as the first switching point 3b described above.

The arrows shown in FIG. 3 give an example of the dispersion paths of the hot switching gases. As can be seen, in each case, the switching gases flow out mainly into the regions of the receiving chamber of the capsule housing 1b formed by the second and third housing section 6b, 7b respectively.

Figure 4:
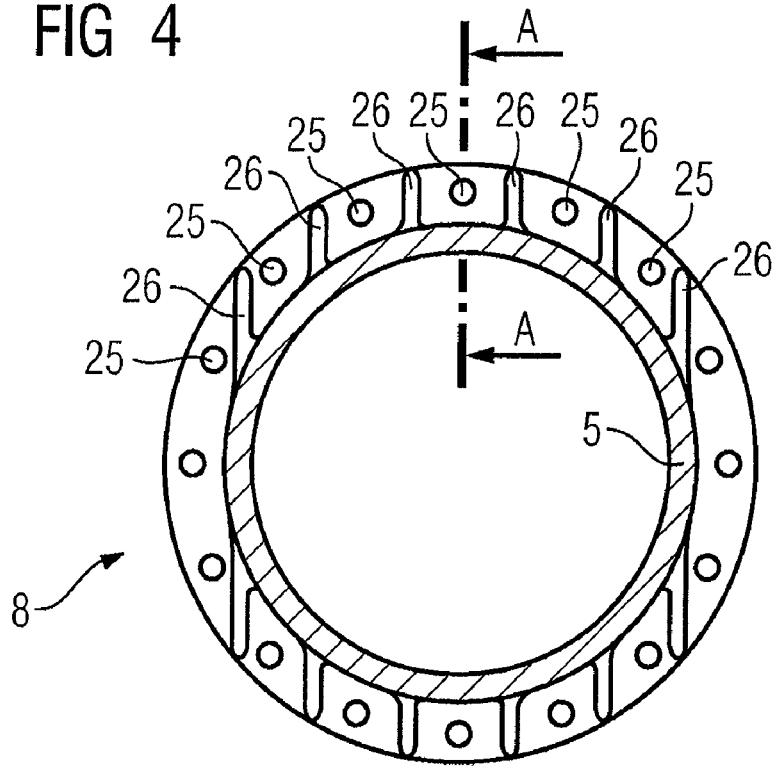
FIG. 4 shows a view on a flat face flange with ribs.

A detailed view of the first flange joint 8 shown in FIG. 1 is shown in FIG. 4. The side of the flat face flange 16, which faces away from the flange surface of the flat face flange 16, is shown in plan view. A multiplicity of openings 25 are made in the circumference. Ribs 26 are arranged between an outer sleeve surface of the first housing section 5 and the flat face flange 16 in order to stabilize the flat face flange 16, which is offset outward. The ribs 26 are designed in the form of plates, the plates being aligned roughly parallel with one another. This gives advantages with regard to the manufacture of the housing parts by casting methods, as the cast bodies can easily be released from a casting mold due to the ribs 26 being aligned on the same axis.

Figure 5:
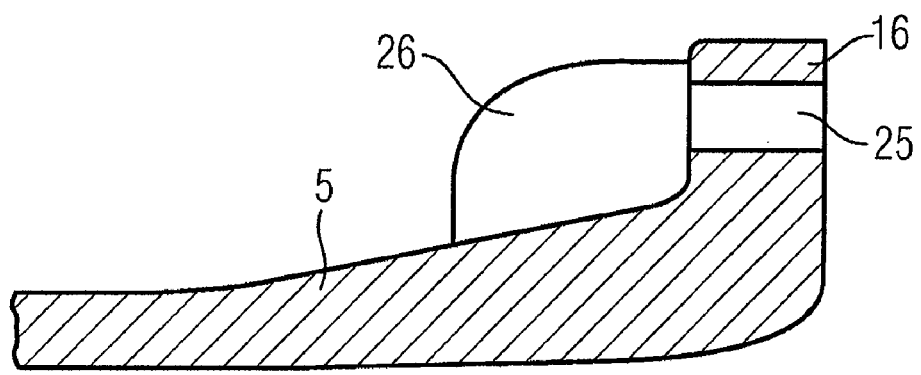
FIG. 5 shows a section through the flat face flange with ribs.

FIG. 5 shows a section along the section axis A-A shown in FIG. 4. An opening 25, which is made in the flat face flange 16, can be seen in the section. A plate-like rib 26 is cast on between the flat face flange 16 and the wall of the first housing section 5 for stabilization.

The invention claimed is:

1. A gas-tight capsule housing, comprising:
    at least three housing sections, including a first housing section, a second housing section, and a third housing section, and extending along an axis in a substantially tubular manner;
    said first housing section being flanged between and connecting said second and third housing sections;
    said housing sections forming a boundary of a pressure-tight receiving chamber for an electrical switching device, said receiving chamber having a smaller cross section in a region of said first housing section than respective cross-sections of said receiving chamber in a region of said second and third housing sections; and
    a flange joint for flanging one of said second and third housing sections onto said first housing section, said flange joint having a flat face flange on said first housing section, which is pressed onto a face of said second or third housing section by way of a releasable joining element, and wherein a wall of said second or third housing section is relatively thicker in a region of said face and the thickened area is formed at least partially radially inward, thereby reducing the cross section of the receiving chamber.

2. The capsule housing according to claim 1, wherein said flat face flange is offset radially outward with respect to said axis of the housing.

3. The capsule housing according to claim 1, wherein the thickened area is formed radially outward to overhang an outer contour of said second or third housing section.

4. The capsule housing according to claim 1, wherein said flat face flange is formed with openings, said second or third housing section has said joining elements anchored in said face, and said joining elements protrude through said openings in said flat face flange.

5. The capsule housing according to claim 4, which comprises mutually parallel ribs formed between said openings and configured to stabilize said flat face flange.

6. The capsule housing according to claim 1, wherein said at least three housing sections are cast bodies formed of electrically conducting material.

7. A gas-tight capsule housing, comprising:
    at least three housing sections, including a first housing section, a second housing section, and a third housing section, and extending along an axis in a substantially tubular manner;
    said first housing section being flanged between and connecting said second and third housing sections;
    said housing sections forming a boundary of a pressure-tight receiving chamber for an electrical switching device, said receiving chamber having a smaller cross section in a region of said first housing section than respective cross-sections of said receiving chamber in a region of said second and third housing sections; and
    substantially identical flange joints formed between said first and second housing sections and said first and third housing sections, respectively.

8. A gas-tight capsule housing, comprising:
    at least three housing sections, including a first housing section, a second housing section, and a third housing section, and extending along an axis in a substantially tubular manner;
    said first housing section being flanged between and connecting said second and third housing sections;
    said housing sections forming a boundary of a pressure-tight receiving chamber for an electrical switching device, said receiving chamber having a smaller cross section in a region of said first housing section than respective cross-sections of said receiving chamber in a region of said second and third housing sections; and
    an interrupter unit of a compressed gas insulated circuit breaker disposed along said axis, and wherein gases produced during a switching operation flow out into said second or third housing sections, respectively, and swirl around therein.

9. The capsule housing according to claim 8, which comprises a drive device introduced into the interior of the capsule housing on a sleeve side of said first housing section.

* * * * *